United States Patent [19]

Bijen et al.

[11] 4,344,804
[45] Aug. 17, 1982

[54] PROCESS AND APPARATUS FOR THE MANUFACTURE OF FIBER-REINFORCED HYDRAULICALLY BOUND ARTICLES SUCH AS CEMENTITIOUS ARTICLES

[75] Inventors: Jan M. J. M. Bijen, Munstergeleen; Johann J. Jansen, Nieuwstadt, both of Netherlands

[73] Assignee: Stamicarbon B.V., Geleen, Netherlands

[21] Appl. No.: 96,477

[22] Filed: Nov. 21, 1979

[30] Foreign Application Priority Data

Nov. 21, 1978 [NL] Netherlands ........................ 7811434

[51] Int. Cl.³ .......................... B28B 1/30; B28B 3/12; B28B 5/02; B32B 13/02
[52] U.S. Cl. ....................................... 156/42; 106/99; 156/166; 156/231; 156/246; 156/540; 162/157 R; 162/210; 162/212; 264/87; 264/257; 264/258; 264/333; 428/286; 428/288; 428/703
[58] Field of Search ....................... 428/286, 288, 538; 106/99; 156/42, 166, 231, 246, 540; 264/257, 258, 333, 87; 162/157 R, 210, 212

[56] References Cited

U.S. PATENT DOCUMENTS

| | | | |
|---|---|---|---|
| 3,591,395 | 7/1971 | Lonsveld et al. | 106/99 |
| 4,085,001 | 4/1978 | Fukuwatari et al. | 264/333 |
| 4,194,946 | 3/1980 | Ootani et al. | 162/210 |
| 4,242,407 | 12/1980 | Bijen | 428/247 |

FOREIGN PATENT DOCUMENTS 1429167 3/1976 United Kingdom .

Primary Examiner—James C. Cannon

[57] ABSTRACT

The present invention relates to a continuous process for manufacturing articles comprised of fiber-reinforced hydraulically bound material. A layer of the fiber-reinforcing and hydraulically bindable materials are placed on a first endless carrier while a second similar layer is formed on a second endless carrier. The layer formed on the second carrier is deposited on the layer formed on the first carrier by reversing the second carrier and the composite layer formed as a result is thereafter given the desired shape and is hardened.

A number of fibrous network structures are used with the hydraulically bindable material and the two are formed into a layer with the networks distributed in it. Water is removed from that layer by suction, while on the second carrier a number of fibrous networks are likewise supplied to be formed into a layer comprised of the hydraulically bindable material with the networks distributed in it and water is also removed by suction from this layer.

The invention is applied in the manufacture of building materials used, for instance, to replace asbestos-cement sheets.

22 Claims, 1 Drawing Figure

PROCESS AND APPARATUS FOR THE MANUFACTURE OF FIBER-REINFORCED HYDRAULICALLY BOUND ARTICLES SUCH AS CEMENTITIOUS ARTICLES

BACKGROUND OF THE PRESENT INVENTION

The present invention relates to a continuous process for the manufacture of fiber-reinforced, hydraulically bound articles. This is accomplished by placing a network and a hydraulically bindable material, on top of two endless conveyors with the conveyors being positioned so that one layer formed on one of the endless conveyors is deposited onto the layer formed on the other conveyor, by use of a reversing roller. Thereafter, the composite structure formed from the two layers is giving the described shape and then hardening the shaped structure. Hydraulically bound material as used herein denotes material bound or hardened by reaction with water.

It is known to employ fibers in hydraulically bound materials to improve the mechanical properties of the article such as the impact strength. The fibers may be of natural original or man-made, inorganic or organic in nature, and may be used in the form of continuous or discontinuous monofilaments or in bundles of filaments. Short pieces of fiber may be mixed with hydraulically bindable material or layers of such fiber pieces may be incorporated in the hydraulically bindable material. However, it is the random orientation of the fibers within the material that is one of the reasons why fiber reinforcement has so far failed to fully satisfy expectations. A drawback inherent in the known way of applying fiber reinforcement to such articles is that part of the fibers do not contribute to the improvement of the properties of the hydraulically bound materials. This is caused not only by their random orientation, but also by their presence in the material in places where they are not needed, e.g. on the neutral axis when bending loads are exerted.

British Pat. No. 118,395 describes a machine for manufacturing plaster slabs in which canvas has been incorporated more or less in the middle of the plaster as a reinforcing element, with the plaster being covered on both sides with a layer of paper or fabric, and, optionally, with additional strips of the fabric applied to the paper or fabric layers so as to ensure smoothness of the cutting plane. The disadvantage inherent in this composition of the plaster slabs is that the fabric network is applied along the axis that is neutral under bending loads. Further, there is no suggestion in this patent concerning the formation of two outer layers in which fiber reinforcement in the form of a network is distributed, with such reinforcing material being located in a position to best assist in absorbing load forces. Further, the machine does not comprise means for removing water by suction or for the application of intermediate or core layers within the composite structure.

French Pat. No. 1,224,611 describes a process and apparatus for manufacturing asbestos-cement sheets, in which several layers of an asbestos-cement slurry are applied, by means of dip rolls, to the undersides of felt bands. The slurry is kept in contact with the felt bands by the application of suction on top of the bands. The layers of slurry formed on the felt bands are united to a single layer by reversing the motion of one of the felt bands, after which the sheets are turned upside down and cut to measure. While it is undesirable to use asbestos fibers, fiber reinforcement is again placed in areas that are neutral with respect to the absorption of load forces, and there is again no suggestion as to the desirability of nor means for applying an intermediate or core layer. Further, the process and apparatus are not suitable for working with fiber reinforcing material in the form of continuous networks of polymeric material, because the hydrophobic nature of such material would repel the cement slurry and the suction force referred to above would be ineffective, if the cement mortar without fibers could at all be applied by means of dip rolls.

U.S. Pat. No. 3,944,698 describes a process for continuously manufacturing gypsum wallboard that includes fiber reinforcing on the outside. The fibers are affixed to a layer of paper and the fibers may be in the form of continuous filaments, arranged in the form of an openwork fiber mat, such as a fishing net or curtain netting, or alternatively a mat composed of short fibers. To a first composite sheet of paper and fibers a layer of gypsum is applied, after which, by reversing the direction of motion, a second composite of paper and fibers is deposited on the layer of gypsum. Subsequently, the gypsum board is given cut to the required length and allowed to harden. The disadvantage of this process is that although a fiber reinforcement is applied to both exterior sides of the gypsum, the resulting structure is not a composite laminate with the outer layers consisting of fiber-reinforced water-hardening material that have undergone the same treatment and are similarly composed. The resulting sandwich-like laminate is identical only at the extreme outside surfaces, as regards the combination of paper and fibers.

Because mesh or network type structures comprised of fibers have been found to represent a considerable advance in improving the properties of hydraulically bound materials, partly because in such structures the fibers are both oriented and well distributed, the present invention is aimed at providing a process for the continuous manufacture of fiber-reinforced materials which avoids the drawbacks of prior processes, but one which better utilizes the relatively expensive reinforcing structures.

SUMMARY OF THE PRESENT INVENTION

According to the present invention this improved process is achieved by supplying a plurality of networks and the hydraulically bindable material onto a first carrier where they are formed into a layer comprised of the hydraulically bindable material with the networks distributed in it, from which layer part of the water is removed by suction. A plurality of networks and hydraulically bindable material are also supplied to a second carrier where they are also formed into a layer comprised of the hydraulically bindable material with the networks distributed in it, from which layer part of the water is removed by suction.

Each layer has a thickness of at least about 1 mm, measured after hardening and contains at least two networks.

The terms network or network comprised of fibers is understood to mean a composition of fibers or filaments of such length and showing such coherence as to form a network. By preference, such a network is continuous, which means that it extends continuously throughout a major dimension of an object containing it, e.g. length or width. An example of a network consisting of fibers is a network of stretched, fibrillated plastic film formed by extruding a plastic material to a film, optionally cutting this film into strips, and stretching it, so that the material gets into a condition of imminent fibrillation. By next passing the material across a pin roll or brush, actual fibrillation is effected. Subsequently, the fibrillated film is expanded laterally, so that a network is formed. Also perforated films, stretched or unstretched, can be used if the film between the perforations consists of fibers or filaments. These networks need not be fibrillated networks, which means that the individual meshes need not be separated by fibrils only. As a result, these networks show high stability, especially at the cross links.

The plastic used for the manufacture of the fibrous networks may be a polyolefin, but other thermoplastics that can be formed into films and fibers may be used, for instance polymers of styrene, acrylonitrile or vinyl chloride, and copolymers thereof. In particular, use is made of partly crystalline polymers, such as polyamides and polyesters. Special preference is given to polyolefins, examples of which are polyethylene and polypropylene. Most preference is given to propylene homopolymer, but use may be made also of copolymers and blockpolymers with, for instance, ethylene. Also, it should be understood that the polymers may contain all kind of fillers and auxiliaries such as, for instance, carbon black, polar substances, pigments, UV stabilizers, heat stabilizers, and anti-oxidants.

The number of openings in the network must be accurately controlled, as must their size and shape. This is very important, as it has been found that the number of openings has a decisive influence on the ultimate strength properties of the finished products.

The number of openings in the networks of fibrillated organic films per unit volume depends on the number of networks used per unit thickness, on the number, size and shape of the openings in each network, and on the degree to which the networks have been expanded in size. All these factors should be controlled so that the number of openings in the organic films is at least about 100 per cubic centimeters in the finished product. Better values are obtained if the number of openings is at least about 200. It is possible to work with a still higher number of openings, for instance a number above about 300, or, very particularly, above about 500. This, in particular, imparts a particularly favorable bending behavior to the finished objects and effects a very fine "multiple cracking" during the pseudo-plastic deformation. This has the favorable consequences of improving the recovery potential, and improving the retention of physical properties. "Multiple cracking" denotes the phenomenon of an object coming to develop discrete small cracks under bending/tensile loads, with the distance between individual cracks being less than about 10 mm. In general, these cracks are smaller than about 0.3 mm.

The number of films per centimeter of the thickness is preferably greater than 10, more in particular greater than 25. The best results are obtained if the number of films is greater than 50. The number of openings in the fibrillated stretched organic film, which has, optionally, been expanded in size, is preferably at least 2 per square centimeter, in particular at least 3 per square centimeter. This number depends on the degree of opening-up or expansion to which the fibrillated film has been subjected, and on the initial number of openings counted both lengthwise and crosswise. The expansion, which may be both crosswise and lengthwise, should preferably be about 1.5 to about 150 times, in particular about 1.5 to about 50 times. The openings should have a diameter or smallest dimension greater than about 200 microns, in particular about 300 microns. It is also possible to apply a network obtained by weaving of long fibers from fibrillated organic film. In such a case the expansion does not deviate much from 1.

The amount of water added to the hydraulically bindable material may vary. Use may be made of an aqueous suspension as well as of a hydraulically bindable material minimally moistened. The minimum degree of moistening depends on the amount of water required to effect complete hardening of the hydraulically bindable material by the reaction with water and on the amount of water to be removed by suction, while the maximum amount of water that can be used depends on the properties which the hardened material should possess. Hence, the weight ratio between water and hydraulically bindable material may range from about 0.2 to about 1. The term "hydraulically bindable material" may also refer to the water-containing mixture.

The fibrous networks may advantageously have been formed by stretching and fibrillating plastic films, or by providing plastic films with openings in other ways. A number of plastic films treated in this way may then be put together and rolled up. When the process according to the present invention is carried into effect, the rolled-up films are fed into the process as webs, by unwinding the films, and optionally widening or stretching them and fixing the size thus obtained.

To obtain proper cooperation between the hydraulically bindable material and the fibrous networks it is important to distribute the networks within the hydraulically bindable material in a manner that avoids the random orientation of the fibers. In a preferred mode, the fibrous networks are fed onto the carrier at a point upstream, in the direction of travel of the carrier from the point where the hydraulically bindable material is itself fed onto the carrier. This procedure yields optimum results if the layer comprised of the networks and the aqueous layer hydraulically bindable material is slightly compacted, for instance by locally exerting pressure on this layer preferably compacted by means of rolls. Any problem caused by adherence of the bindable material, for instance cement, to such rolls is adequately obviated by the present invention, since the reversing roller acts as a compacting roller. Further, by feeding the networks in this fashion produces an additional advantage in that the difference in specific weight between the fibers and the hydraulically bindable material contributes a certain degree of spontaneous distribution of the fibers within the slurry of the hydraulically bindable material, and aids in forming the highest concentration of fibers in places where they will produce the best effect, i.e. at or near the surface.

A high water to binding-agent factor has an unfavorable effect on the properties of a hydraulically bound material. Hence, it is important to control the withdrawal of excess water. A known way of doing this is to use suction for the withdrawal of water from aqueous layers of hydraulically bindable material on a moving carrier. If the outer layers of the article to be produced were both formed on the same carrier, dewatering would be difficult and take a long time and, additionally, be non-uniform, which would cause differences in properties between the layers. Consequently, it is highly important that the outer layers of the composite layer to be formed be dewatered separately.

It is advantageous to use symmetrical structural elements. To obtain this symmetry, according to the invention, a layer comprised of one or more layers of the hydraulically bindable material, water and fibrous networks is formed on a second moving carrier. By having the second carrier travel in the direction opposite to the motion of the first carrier, and reversing the travel of the layer formed on the second carrier, this layer can be deposited upside down on the layer or layers formed on the first carrier.

Consequently, the process according to the present invention is very suitable for effecting symmetry by continuous application of fibrous networks in suitable places and uniform withdrawal of excess water. In this way the configurations of the outer layers of the object formed may be made virtually identical.

In dependence on the requirments to be met by the finished article as such, the strength of the outer layers can be adjusted by variation of the network content and the thickness of the layers. Increasing the network content and the layer thickness can be effected, for instance, by repeating the layer formation on the moving carriers. The build-up of the layers may be such that the network content decreases towards the horizontal center plane of the object.

The hydraulically bindable material used in the form of an aqeuous suspension in the process according to the invention may be a hydraulic inorganic cement, for instance Portland cement, aluminum cement, Roman cement, cement containing magnesia, gypsum, lime, or mixtures thereof. Also, fillers may be incorporated, for instance sand, stone, perlite, wood chips, foamed polymer granules and other similar products, as well as other additives, such as flow promoters, hardening accelerators and the like.

As stated before, use of continuous networks of polypropylene or polyethylene, to obtain high strength and other desired properties are preferred. These networks may be made by stretching and fibrillating, for instance, polypropylene films, the number of openings per square centimeter of network being preferably at least 2, and the number of openings per cubic centimeter of final product being at least about 200, more in particular at least about 300. These values naturally apply to that part of the final product in which the fibers have been incorporated is left out of account in the determination of these values. In addition, to improve the bond between the polypropylene fibers and the hydraulically bindable material, acid groups may be incorporated in the polymer in amounts ranging from about 0.01 to about 25% by weight, calculated in relation to the polymer.

Besides networks, loose fibers may be used too. These fibers may be inorganic fibers, such as asbestos, glass fibers, steel fibers, or synthetic fibers of polypropylene, polyethylene, nylon, or acrylic fibers, or natural organic fibers, such as cotton, sisal, or jute.

The articles made by the process according to the present invention may be given great versatility in application by providing between the two fiber reinforced layers a third, so-called intermediate layer that is formed on the first moving carrier so that it will come to rest on top of the layer formed by the fibrous networks and the hydraulically bindable material. The intermediate layer may be comprised of fillers and/or hydraulically bindable material (cement, gypsum, lime), or of material bound in another way, for instance sand bound with polyester resin. Furthermore, it is possible to put on or in the intermediate layer an adhesive that makes layers formed by the fibrous networks and the hydraulically bindable material adhere to the material forming the intermediate layer. The adhesive may be comprised, for example, of a hydraulically bindable material, thermosetting glues or moisture-hardening adhesives.

The function of the intermediate layer is determined by the material used to form this layer. If the intermediate layer is to add to the strength of the article being formed, it may be comprised of a hydraulically bindable material and fillers, which fillers may be either heavy (sand, gravel), or light (expanded clay granules) materials. If the article to be formed is to exhibit an insulating and structural characteristics appropriate insulating materials can be incorporated within the intermediate layer such as, for example, foaming agents, plastic foam or granules of foamed plastic, or perlite or mineral wool.

BRIEF DESCRIPTION OF THE FIGURE

The present invention will be more fully described in the following description, in which reference is made to the annexed drawing which is a diagram of the preferred exemplary embodiment of the device according to the present invention.

DETAILED DESCRIPTION OF THE PREFERRED EXEMPLARY EMBODIMENT

Figure 1:
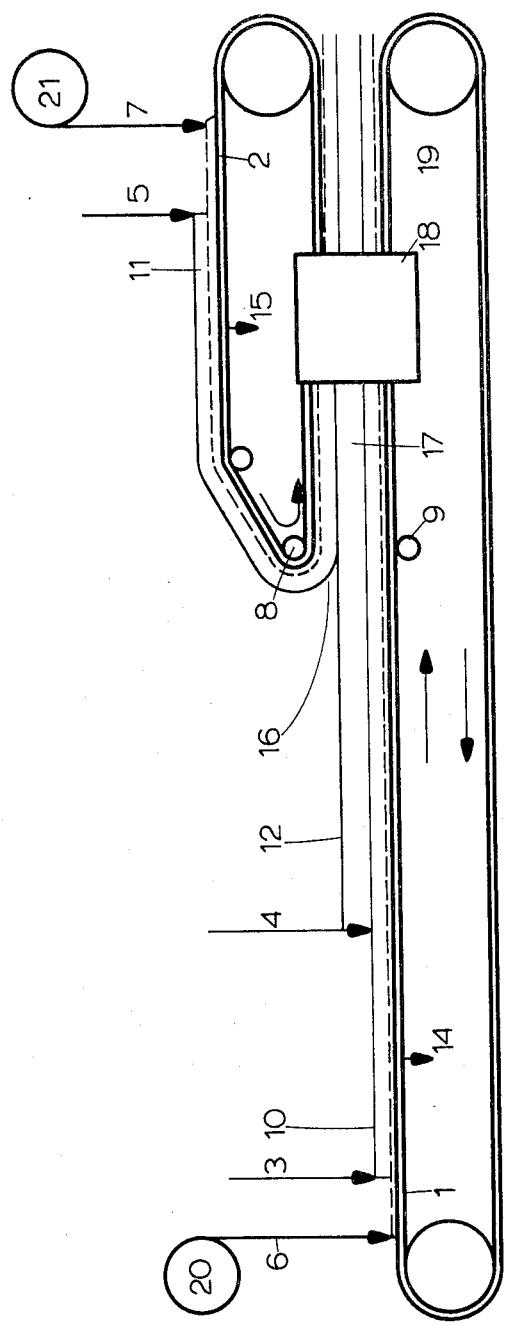

With reference to the FIGURE, two synchronously travelling endless carriers are shown at 1 and 2, respectively. When material is first deposited upon these carriers or conveyors, the surfaces receiving the deposited material are travelling toward one another in opposite directions. In particular, conveyor 2 is positioned a predetermined distance above conveyor 1 and as can be noted from the drawing is shorter than conveyor 1. Also, the direction of conveyor movement is shown by the arrows.

Mortar or the hydraulically bindable material is fed to conveyors 1 and 2 at stations 3 and 5, respectively, by conventional feeding equipment, with the thickness of the deposited layer being at least about 1 mm.

For each conveyor, a fiber network feeding station 6 and 7, respectively, is provided upstream from mortar feed stations 3 and 5, with the network structures being fed from rollers 20 and 21. However, it should be understood that the network feed stations could be located downstream from mortar feed stations 3 and 5 with such feeding possibly occurring with or without the feeding of network structures from the above mentioned upstream feed stations.

Although stretching, fibrillation and lateral expansion of the polypropylene films can be effected in such a way that 4 openings can be formed per square centimeter, and by combining a number of 75 networks 500 openings can be obtained per cubic centimeter in that part of the finished product in which fibers were incorporated. The lateral expansion of the films can be effected in a way described in the non-prepublished Netherlands patent application No. 7,809,679. The thickness of each of the layers 10 and 11 formed can be 6 mm and conveyors can travel at the rate of 10 meters/minute, with the feed of the fibrous networks being synchronized with this speed. Excess water can be removed by separate suction at 14 and 15. At feed station 4, a layer 12, consisting of premixed cement, sand and water, in a proportion of 1:0.2:0.4 can be deposited on layer 10. The thickness of layer 12 can be 1 mm. The direction of travel of carrier 2 is at first opposite to that of carrier 1. After carrier 2 has passed around a reversing roller 8, the carriers 1 and 2 move in the same direction. The composite layer 17 now formed can be compacted by the combined action of support roller 9 and reversing roller 8. The composite layer 17 after being further compressed by device 18 can be continuously formed into sheets measuring 1250×3000×7 mm with the sheets exhibiting a bending tensile strength of 30 MPa.

What is claimed is:

1. A process for manufacturing articles comprised of fiber-reinforced, hydraulically bound materials comprising the steps of forming a first layer by incorporating a hydraulically bindable material into a plurality of continuous plastic networks on a first conveyer, said continuous plastic networks being comprised of a composition of coherent fibers or filaments, stretched and fibrillated plastic films or perforated sheets of films, continuously forming a second layer by incorporating, a hydraulically bindable material into a plurality of continuous plastic networks on a second conveyor, removing a predetermined quantity of water from each layer and subsequently forming a composite layer structure by depositing the layer formed on one of the conveyors onto the layer formed on the other conveyor so that the one deposited is turned upside down and finishing the article.

2. A process as set forth in claim 1 wherein the plastic networks extend continuously throughout a major dimension of the reinforced article.

3. A process as set forth in claim 2 wherein at least 10 networks are used in each layer.

4. A process as set forth in claim 1 wherein the perforated film is unstretched.

5. A process as set forth in claim 1 wherein the perforated film is stretched.

6. A process as set forth in claim 1 wherein the network forming material is a thermoplastic.

7. A process as set forth in claim 1 wherein the network forming material is a polyolefin.

8. A process as set forth in claim 1 wherein the plurality of networks are provided with openings arranged at a density of at least about 100 per cubic centimeter.

9. A process as set forth in claim 1 wherein the plurality of networks are provided with openings arranged at a density of at least 200 per cubic centimeter.

10. A process as set forth in claim 1 wherein the plurality of networks are provided with openings arranged at a density above 200 per cubic centimeter.

11. A process as set forth in claim 1 wherein fibrillated films are used as the networks with the films in each layer being expanded so that openings are produced therein having a density of at least 2 per square centimeter.

12. A process as set forth in claim 11 wherein the fibrillated films in each layer are expanded so that openings are produced therein having a density of at least 3 per square centimeter.

13. A process as set forth in claim 11 wherein the fibrillated film is expaned to produce openings, the smallest dimension of which varies from about 200μ to about 300μ.

14. A process as set forth in claim 1 wherein the hydraulically bindable material comprises a water containing mixture in which the ratio, by weight, of the water to the dry hydraulically bindable material ranges from about 0.2 to about 1.0.

15. A process as set forth in claim 1 the step of forming a composite layer structure includes the step of compacting the layers from the first and second layers.

16. A process as set forth in claim 1 further including the step of feeding another, intermediate layer of different composition so that it will be positioned between the first two layers that are brought together to form the composite layer structure.

17. A process as in claim 2 wherein said film is fed onto said first and second conveyors, respectively, upstream from the point of introduction of the hydraulically bindable material thereon.

18. A process as in claim 17 wherein said film is fed so as to have a predetermined orientation on said conveyors and within said article.

19. Apparatus for forming a composite layer structure comprised of network-reinforced hydraulically bindable material said apparatus including first and second conveyor systems, said second conveyor system being mounted above the other with the two systems having material receiving areas that move in opposite directions, first and second network-reinforcing feed stations for respectively feeding network-reinforcing material onto the first and second conveyor systems, first and second hydraulically bindable material feed stations, located respectively adjacent said first and second network-reinforcing feed stations, for respectively feeding hydraulically bindable material onto said first and second conveyor systems, means for reversing the direction of travel of said second means for reversing conveyor system so that the material thereon will be brought into contact with the material on said first conveyor system, compaction means for compacting the contacting layers and suction means, located downstream from each of said first and second hydraulically bindable material feed stations, for removing liquid from the material deposited on each conveyor system.

20. Apparatus as in claim 19 wherein the reversing point of said second conveyor system is positioned downstream from the feed stations of said first conveyor system.

21. Apparatus as in claim 19 further including a third feed station for feeding additional material onto said first conveyor system at a point downstream from said first hydraulically bindable material feed station.

22. Apparatus as in claim 19 wherein said first and second network-reinforcing feed stations are respectively positioned upstream from said first and second hydraulically bindable material feed stations.

* * * * *